March 14, 1967     H. G. LANGHJELM ETAL     3,308,889
VARIABLE PITCH PROPELLER WITH AUTOMATIC ADJUSTMENT
Filed July 6, 1965     2 Sheets-Sheet 1

INVENTORS
HENRIK G. LANGHJELM
CHARLES J. DIGIOIA
BY
ATTORNEYS

March 14, 1967  H. G. LANGHJELM ETAL  3,308,889
VARIABLE PITCH PROPELLER WITH AUTOMATIC ADJUSTMENT
Filed July 6, 1965  2 Sheets-Sheet 2

INVENTORS
HENRIK G. LANGHJELM
CHARLES J. DIGIOIA
BY
ATTORNEYS

United States Patent Office 3,308,889
Patented Mar. 14, 1967

---

3,308,889
VARIABLE PITCH PROPELLER WITH AUTOMATIC ADJUSTMENT
Henrik G. Langhjelm, Southfield, and Charles J. Di Gioia, Birmingham, Mich., assignors to Finn Bergishagen, Birmingham, Mich.
Filed July 6, 1965, Ser. No. 469,779
6 Claims. (Cl. 170—160.51)

The invention relates to variable pitch propellers suitable for aerodynamic and hydrodynamic use. More particularly the invention concerns an automatic, self-sensing variable pitch propeller suitable for marine use in connection with commercially available power plants, both inboard and outboard.

It has long been known that boats which operate under widely different speeds and propeller loadings can be operated more efficiently, in regard to quite a number of operational aspects, with a variable pitch propeller. It has heretofore been proposed to use hydraulics or electricity to control the propeller pitch of large marine craft and to use one or another type of mechanical device, adjustable by hand or by the use of springs, to control the propeller pitch of smaller marine craft.

While it has been suggested that the pitch of the propeller can be made automatically adjustable to suit various conditions of operation, the devices heretofore suggested for such purposes have not been very satisfactory, by reason of inability to maintain desired synchronism, limitations in regard to available range of pitch and/or propeller size, impracticality as to manufacture, and the like.

It is therefore a general object of the present invention to provide an automatically adjustable variable pitch propeller which is free of such drawbacks and has many advantages discussed in detail in the remainder of the specification.

A more specific object of the invention is to provide a self-contained automatic variable pitch propeller composed of two or more blades mounted in a novel manner on a basic hub unit or assembly, which propeller is suitable for either light or heavy marine duty whether it be in the recreational, commercial, or military field.

Another object of this invention is to provide a means whereby, in the event that a blade is bent or damaged, the pitch of any one blade can easily be changed in either a clockwise or counterclockwise direction in order to re-synchronize it with the remaining blades and allow the craft to be propelled in a nearly normal manner.

It is another object to provide a propeller hub and blade assembly enabling blades of any size, area, or design to be easily interchanged on the basic hub, thus eliminating the necessity of maintaining a large propeller inventory.

Still another object is to provide in a propeller structure a unique shock absorbing system which in itself is an integral part of the internal mechanism and acts to greatly reduce the possibility of damage to the propeller blade or the hub mechanism.

Yet another object is to provide a basic unit which is adaptable to any presently produced marine power plant.

A further object of this invention is to provide a very simple device which is inexpensive to manufacture, practical, and easy to assemble.

In more structural respects, it is an object to provide an improved basic propeller hub which mounts in an improved way a plurality of radial blade and bevel gear units, all meshing with a common bevel gear and spring biased cam unit, these units providing for an improved automatic adjustment of blade pitch and affording the above mentioned and other advantages, to be hereinafter detailed. Among these are the ability to make a complete synchronization of blade angles to meet any condition of horsepower requirement at any given r.p.m.; the fact that the hub is entirely self-contained for automatic operation, without external wires, cables or the like; the fact that the system is highly versatile in its self-sensing operation to meet any individual requirement, etc.

Furthermore, an integral sleeve extension of the hub affords a direct connection for the drive of the latter from an existing propeller shaft, as well as a mount for various gear and cam members to be described.

The foregoing as well as other objects will become more apparent as this description proceeds, especially when considered in connection with the accompanying drawings illustrating the invention, wherein.

Figure 1:
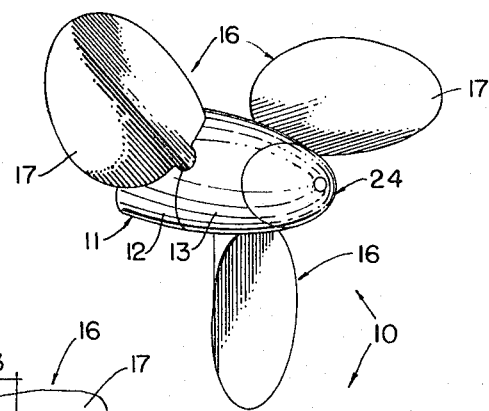
FIGURE 1 is a perspective view of a propeller hub embodying the invention.
Figure 2:
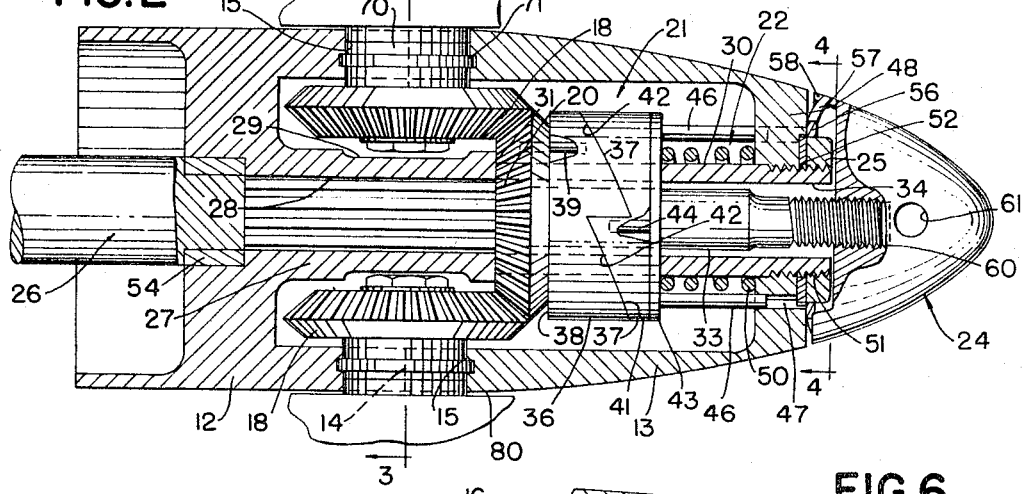
FIGURE 2 is a longitudinal and axial section through the hub on the line 2—2 of FIGURE 3, its cam unit being shown in position corresponding to no load.

Referring to FIGS. 1 and 2 of the drawings, the propeller 10 of the invention comprises a housing-like hub 11 composed of two main, hollow, forward and aft shells 12, 13, of circular cross section. These meet at a transverse annular and radially extending zone 14, at which the shells are formed to provide pairs of generally semi-cylindrical, radially extending bearing seat halves 15 in equally spaced circumferential relation to one another about the respective shells 12, 13. Bearing seats 15 coact to provide bearings in which are fitted two or more (typically three) propeller blade assemblies, each generally designated 16, and each including a blade 17 proper and a bevel gear 18. The three gears 18 mesh with a bevel gear 20 of a common, gear and cam assembly 21 on the axis of hub 11. That assembly in turn bears rearwardly against the compression spring and guide unit 22 thereof, which holds one of two cam parts of assembly 21 against rotation, while resiliently sustaining that part.

The hub structure of propeller 10 is completed by an ogive-shaped end cap 24 enclosing a hex-shaped nut 25 which holds the gear-cam assembly 21 in place, as will be later described in detail.

The forward or inner hub shell 12 telescopes axially upon the usual propeller shaft 26 of the craft; and shell 12 is formed to provide an integral and elongated, inner hub sleeve extension 27 which projects aft thereof coaxially of the shells 12, 13 and throughout the axial length of the aft or outer shell 13.

Hub sleeve extension 27 and shaft 26 have splined driving engagement at 28 within the shells 12, 13 and across the meeting zone or plane 14 of the latter; and sleeve 27 is externally relieved in an annular zone 29 to accommodate the bevel gears 18 of the several blade and gear assemblies 16. Thus the integral sleeve extension of the improved hub affords a driving connection for the latter at the usual and existing splining of the propeller shaft, without alteration of the latter.

Adjacent the rear of the splined intermediate portion of hub sleeve extension 27, the latter is reduced substantially in diameter to provide an annular, radially extending shoulder 31, against which the face of the bevel gear 20 of the gear cam assembly 21 has running engagement. Aft of its intermediate splined zone the propeller shaft 26 is also reduced in diameter at 30, its splined portion extending a bit into the bore 34 of hub extension 27, so that the gear-cam assembly 21 to some extent pilots on the shaft splines, although being entirely free of the latter in the driving sense. The bevel gear 20 and one cam half of the gear-cam assembly 21 have a rotary mount on the reduced part 30 of extension 27; and the other half of assembly 21 has an axial sliding mount on the same part 30.

The assembly 21 comprises a cylindrical primary cam ring 36 which telescopes over the reduced diameter aft portion 30 of sleeve extension 27 with reasonable sliding clearance. Primary cam 36 presents a plurality of inclined cam ramp surfaces 37 of equal circumferential extent; and the forward face 38 of cam 36 is in a radial plane transverse of the hub and propeller axis, at which surface 36 the cam engages the rear surface of the bevel gear 20 of unit 21. Cam 36 is coupled for rotation with gear 20, as by means of one or more axially extending pins 39.

A secondary cam ring 41 of the assembly 21 is formed to provide on its forward axial end a plurality of cam ramp surfaces 42, which have mating engagement with the primary cam ramp surfaces 37, as illustrated in FIG. 2, in which the respective surfaces have maximum area engagement.

Although the primary and secondary cam members or rings 36, 41, respectively, may be made of any suitable rigid and wear-resistant material, they are by preference of nylon or other equivalent plastic which is tough, non-corrosive, and self-lubricating.

Secondary cam 41 has flush aft engagement with an annular pressure plate or ring 43, to which it is non-rotatably coupled, as by one or more axially extending pins 44 on pressure plate 43. This plate and secondary cam 41, like primary cam 36 and axial bevel gear 20, have a reasonable sliding fit on reduced hub extension 30.

The pressure plate or ring 43 carries two or more rearwardly extending guide and restraining rods or pins 46, which are rearwardly receivable in axially extending holes through the aft wall 48 of hub shell 13; and a coil compression spring 50 of carefully selected rate encircles sleeve extension portion 30, acting under compression between pressure plate 43 and the shell wall 48. As a natural alternative to a single spring 50, a plurality of springs, each piloted on a restraining and guide rod 46, may be employed.

The extreme aft end of the sleeve reduction 30 is threaded at 51, where it extends through an axial bore of shell wall 48. The hex holding nut 25 is threaded on these threads, with a suitable spring-type washer 52 interposed between the nut and the wall 48.

Figure 4:
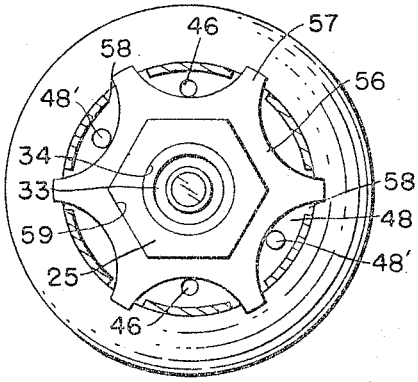
FIGURE 4 is a transverse section on the line 4—4 of FIGURE 2.

Thus, with nut 25 tightly taken up, the propeller hub 11, as otherwise piloted forwardly on propeller shaft by an appropriate bushing 54 or the like (FIG. 1) is solidly held in place against axial shift, while rotatably driven by the propeller shaft. Means are also provided to insure against loosening the mounting connection afforded by the threaded means under operating torque or excessive vibration. To this end, reference being had to FIG. 4 of the drawings in conjunction with FIG. 2, an initially flat annular lock washer 56 of suitably stiff stock is provided, which is in a generally star-shaped external outline presenting a plurality of equally spaced radially outwardly projecting prongs or tines 57, and these tines are adapted to register with correspondingly spaced radial openings 58 through the ogive cap 24. The lock washer 56 has a central aperture 59 of hex outline to mate with that of holding nut 25. The guide and restraining pins 46 of the pressure plate 43 of secondary cam 41 terminate short of the aft surface of wall 48; and rotation of the lock washer 56 is suitably prevented, as by engagement with rear projections 48′ on the wall, as shown in FIG. 4.

Figure 5:
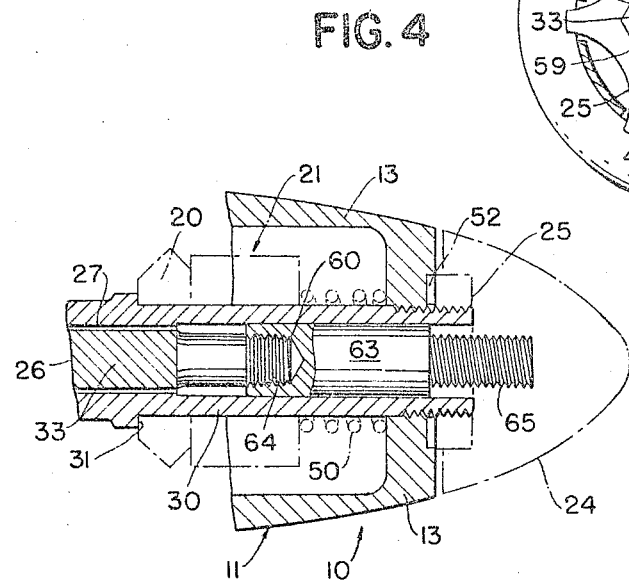
FIGURE 5 is a fragmentary view in axial section through the rear end of the hub, illustrating an adapter for facilitating connection of the hub to a standard propeller shaft.

As depicted in FIG. 2, the reduced aft shaft extension 33 (or an adaptive modification thereof as illustrated in FIG. 5, to be described) extends outwardly of the hub sleeve extension 27 and is externally threaded at 60 for mating engagement by a tapped internal bore of aft cap 24; and the latter has one or more externally opening holes 61 for engagement by a spanner or like tool in completing the assembly of hub parts which have to this point been described in detail. In this operation, after holding nut 25 has been tightly taken up on threading 51 of reduced sleeve extension 30, the lock washer 56 is, after its prongs 57 have been twisted a trifle, slipped onto the nut in mated engagement of their hex outlines; and the aft cap 25 is then drawn up on the threading 60 of shaft portion 33, or its alternative adapter construction (to be described). The cap 24, as thus drawn in place, has its radial openings 58 in register with the lock washer prongs 57. This locks the nut firmly onto the hub sleeve extension 27, proof against significant displacement under torque or extreme vibration.

Moreover, even in the unlikely event that lockwasher 56 does not prevent some slight degree of rotation of nut 25, the spring washer 52 exercises a constant aft thrust against the nut, so that separation of hub shells 12, 13 at their meeting plane 14 is impossible.

In operation, as thus far described, it is seen that with the axial bevel gear 22 of gear and cam unit 21 variably driven in one rotative direction or another by the blade and bevel gear units 16, the primary cam 36, rotating with gear 21 on the journal afforded by reduced sleeve extension 30, will have ramp camming or wedging engagement at its inclined surfaces 37 with the corresponding surfaces 42 of secondary cam 41. The latter is, however, restrained from rotation relative to the hub shell 13 by the pins 46; and the secondary cam structure 41 of assembly 21 is therefore forced in the axial direction along sleeve extension part 30 against the resistance of the spring 50. The range of such movements in either direction will be between limits at which the cam 41 is in full mating engagement with the cam 36 (FIG. 1), with spring 50 fully expanded, and a maximum opposite throw limit (FIG. 6), at which spring 50 is fully bottomed between pressure plate 43 and the shell wall 48. Further aspects of the operation of gear and cam unit 21 will be later referred to.

As referred to above, reference being had to FIG. 5 of the drawings, a modified adaptation of the aft end of the propeller shaft of the rear reduced extension 33 is also contemplated. This is for the purpose of enabling the propeller assembly or system 10 to be attached to any existing propeller shaft, for instance one of shorter axial length than appears in FIG. 2.

To this end, corresponding numerals designating corresponding parts previously described, a barrel-like adapter cylinder 63 of adequate axial length is internally threaded at 64 at its forward end and tightly taken up on the threading 60 of propeller shaft reduction 33. The aft portion of adapter 63 is reduced in diameter and externally threaded at 65 to receive the aft hub cap 24, and holding nut and locking components associated therewith, in the manner previously described.

Figure 7:
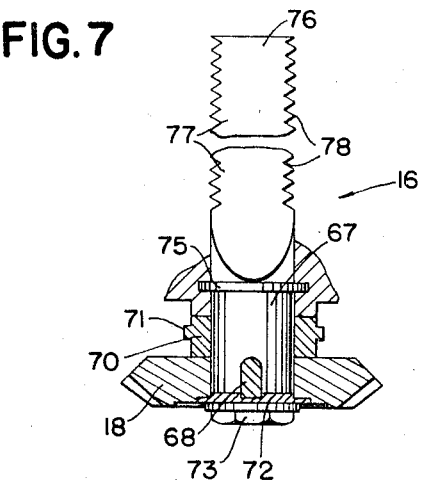
FIGURE 7 is a fragmentary axial section through a blade and bevel gear shaft showing the mode of attachment of the gear to the blade.
Figure 3:
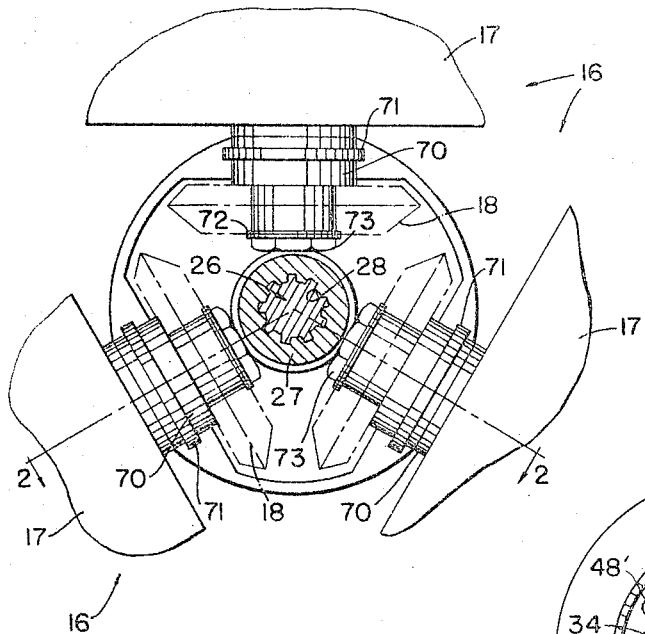
FIGURE 3 is a transverse section on the line 3—3 of FIGURE 2.

The propeller and bevel gear assemblies 16 are identical, reference being now had to FIGS. 3 and 7 in conjunction with FIG. 2. Each comprises, in addition to its bevel gear 18 proper, a cylindrical, blade-mounting body member 67 upon which the gear 18 is slidably telescoped from an inner axial end (bottom in FIG. 7) and held against rotation relative to the cylindrical part 67, as by a key 68. The blade mounting body 67 also receives telescopingly a generally cylindrical bearing ring 70 of a suitable bearing material, nylon or like rigid plastic being preferred for its properties mentioned above, the ring 70 being molded or otherwise formed to provide an integral, radially outwardly extending restraining flange or shoulder 71.

As best illustrated in FIG. 7, the bearing member or ring 70 is slipped onto the cylindrical blade mountnig part 67, prior to the key mounting of bevel gear 18 on that part. Gear 18 is counterbored to receive an appropriate lock washer 72, and is axially tapped for the reception of a lock bolt 73.

The cylindrical blade mounting part 67 is formed to provide an integral, annular outwardly projecting shoulder 75 and, radially outwardly (upwardly in FIG. 7) of that shoulder, is further formed to provide an elongated integral lock extension 76. This extension has diametrically opposite flat side surfaces 77, and is serrated or toothed at 78 along the edges. In accordance with the invention it is contemplated that the blade 17, of aluminum, brass, bronze or other desired metal, shall be cast directly upon the mounting member about its annular flange 75 and the elongated blade-locking extension 76, which may be broken or cut off to the length desired for the purpose. Thus blade 17 is strongly and rigidly secured to the mounting portion 67 of the blade-gear assembly 16, and rigidly coupled by other means described to the bevel gear of the latter.

The assembly of the units 16 to the hub structure 11 of propeller 10 is performed substantially concurrently with its completion by the assembly of the axial gear and cam unit 21, plus associated components, in the manner previously described. With the primary and secondary hub shells 12, 13 separated, the bearing ring 70 of the previously assembled blade gear unit 16 is disposed between the generally cylindrical bearing seats or halves 15 of the respective shell members, which have an appropriate bearing finish and include semi-circular grooves 80 (FIG. 2) to receive the restraining shoulder 71 of the bearing ring 70. Thus mounted, the assembly of axial gear-cam unit 21, bringing its gear 20 into mesh with the gears 18 and in axial running engagement with the shoulder 31 of hub sleeve extension 27, is carried out to completion. In operation, unit 21 performs in the manner previously described in some detail.

The blades 17 may be of any pitch diameter and external configuration to operate clockwise, or counterclockwise, and may be in single or multiple stacks or of special design, all as predetermined by standard mathematical formulations. Though described as preferably cast to their respective mounts, the blades may also be attached to their gear 18 in other ways, as by set screws, through bolts, by means of a tapered fit, or the like. By the same token, the hub 11 may be attached to any of the various shafts available, such as spline shafts, key slots, or tapered shafts.

The novel gearing mechanism afforded by the assemblies 16 and 21 insures complete synchronization of the blade angles, regardless of wear on the gear teeth. Thus, in accordance with the invention the gear 18 of the blade assembly is so designed that each bevel gear tooth represents one increment of pitch angle. By merely rotating the blade gear 18 to alter its mesh with central hub gear 20 to the extent of one tooth in either a clockwise or a counterclockwise direction, the pitch angle of the blade 17 is changed by one unit, the center gear being used for registration and as a locking device.

The hub 11 is seen to be a basic unit adaptable to blades of any pitch circle or design to meet any condition fo HP requirement or shaft output at any given r.p.m. Since the purpose of the variable pitch propeller 10 is to respond to the varying conditions of vessel load and attitude, the operating pitch range (from maximum to minimum) is preadjusted by the operator and need not be readjusted. As an example, in order to achieve a pitch range of 12 inches to 16 inches, the hub is merely disassembled quickly and the blade units 16 rotated to the desired high position. The low position is automatically determined by the bottoming out of the compression spring or springs 50. The hub is adaptable to a series of formulas of pitch diameters without changing any of the inner mechanisms.

In the event that one blade is damaged or bent, a mere resetting of that blade to a position other than that of the original synchronization, compensates for the change in pitch of the damaged blade, reduces excessive vibration, and allows the operator to proceed in a nearly normal manner.

The central gear-cam assembly 21 transfers the force from the propeller blades to the compression spring means 50, which performs the important sensing function of determining how far the propeller blades will change their pitch angle. It determines, by its resistance, how much force will be required to cause the propeller blades to so change pitch angle. The spring or springs 50 also perform a cushioning action, absorbing the shock of a sudden blow on a propeller blade or blades and thereby eliminating the need for a rubber cushion or a shear pin.

Figure 6:
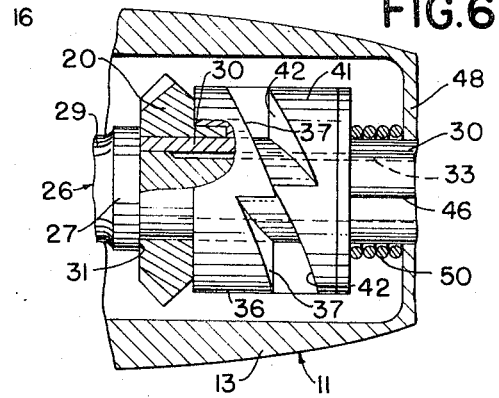
FIGURE 6 is a fragmentary view in section similar to FIGURE 2, showing the position of the cam unit under heavy load.

In operation, when a force is applied to the face of the propeller blade 17 it rotates around its axis and is made to change from the minimum load of FIG. 2 position to a different position, up to that shown in FIG. 6, depending upon the load applied to the propeller. The blade continues to hunt or oscillate back and forth to seek a position which is most stable to the force applied. When the load is removed, the compression spring relaxes and the propeller blades return to their original or minimum load position.

The advantages of the propeller of the invention are numerous. The entire system is self-contained and automatic in response, dispensing with wires, cables and/or cockpit controls. There is no guesswork as to what type or how many propellers to buy; the selection and making of basic settings governing the traverse from between maximum and minimum (depending upon the size, weight and power requirement) are determined by the manufacturer or authorized dealer, and they may be changed at will.

Another advantage of the propeller is its versatility. The unit is capable of fine adjustment to meet any individual requirements. The propeller is readily removed to enable its traverse spring 50 to be changed without removing or changing any other parts. The propeller may be made to fit any existing motor and, by the use of a suitable adapter kit, can be made to fit any type of conventional shaft.

Furthermore, the purchase of one hub 11, with its built-in gearing, and a series of blade units 16 having different blade attack faces, affords to the owner all that is necessary to cope with any marine situation, plus making possible the saving of space and cost involved in purchasing several propellers. The self sensing nature of the mechanism reduces gas consumption, and allows a boat to get up and plane faster than one with a fixed pitch propeller. It adjusts itself to waves, wind, or other forces which tend to change the hull's attitude. Thus, when riding the crest of a wave or wake of a large vessel, the blades open up instantaneously when out of the water and immediately close down when re-entering the water.

It is to be understood that the form of the invention herewith shown and described is to be taken as a preferred embodiment. Various changes may be made in the shape, size, and arrangement of parts; likewise equivalent elements may be substituted for those described herein, all without departing from the spirit or scope of the invention as described in the appended claims.

What we claim as our invention is:

1. A variable pitch propeller comprising an axially extending hub, a power shaft disposed coaxially within said hub, said hub having an internal and axially elongated extension at which said shaft is drivingly connected thereto, a plurality of propeller blades journaled by said hub on axes each in a plane radial to the hub to permit rotation of each blade to vary its pitch angle, and resilient means in said hub for applying biasing torque to said blades about the axes thereof in a direction to urge the same toward their greatest pitch angle, said means being responsive to rotative blade adjustment in the opposite direction under increasing fluid pressure load on the blades to increase the blade-biasing torque applied by said means, said resilient means including a first cam rotatively journaled in said hub on said extension of the latter and rotatively responsive to said blade adjustment, said first cam being in axially fixed relation to said hub extension, a second cam mounted for axial sliding on said hub extension, said second cam coaxially engaging said first cam and being restrained in said hub against rotation relative to the latter, said second cam being axially movable in response to rotation of the first cam, and a spring unit urging said cams against one another.

2. A variable pitch propeller comprising an axially extending hub, a power shaft disposed coaxially within said hub, said hub having an internal and axially elongated extension at which said shaft is drivingly connected thereto, a plurality of propeller blades journaled by said hub on axes each in a plane radial to the hub to permit rotation of each blade to vary its pitch angle, and resilient means in said hub for applying biasing torque to said blades about the axes thereof in a direction to urge the same toward their greatest pitch angle, said means being responsive to rotative blade adjustment in the opposite direction under increasing fluid pressure load on the blades to increase the blade-biasing torque applied by said means, said resilient means including a first cam rotatively journaled in said hub on said extension of the latter and rotatively responsive to said blade adjustment, said first cam being in axially fixed relation to said hub extension, a second cam mounted for axial sliding on said hub extension, said second cam coaxially engaging said first cam and being restrained in said hub against rotation relative to the latter, said second cam being axially movable in response to rotation of the first cam, and a spring unit urging said cams against one another, said spring unit being flexible from a position of minimum flexure corresponding to the greatest blade pitch angle to a position of maximum flexure corresponding to the least blade pitch angle, at which the spring unit is thereafter inflexible, and vice versa.

3. A variable pitch propeller comprising an axially extending hub, a power shaft disposed coaxially within said hub, said hub having an internal and axially elongated extension at which said shaft is drivingly connected thereto, a plurality of propeller blades journaled by said hub on axes each in a plane radial to the hub to permit rotation of each blade to vary its pitch angle, and resilient means in said hub for applying biasing torque to said blades about the axes thereof in a direction to urge the same toward their greatest pitch angle, said means being responsive to rotative blade adjustment in the opposite direction under increasing fluid pressure load on the blades to increase the blade-biasing torque applied by said means, said resilient means including a bevel gear rotatable with each blade, a further bevel gear journaled in said hub on the axis of the latter and meshing in common with said blade gears, a first cam rotatable with said further gear, said further gear and first cam being rotatably journaled and axially fixed on said hub extension, a second cam mounted for axial sliding on said extension, said second cam coaxially engaging said first cam and being restrained in said hub against rotation relative to the latter, said second cam being axially movable in response to rotation of the first cam, and a spring unit urging said cams against one another.

4. A variable pitch propeller comprising an axially extending hub, a power shaft disposed coaxially within said hub, said hub having an internal and axially elongated extension at which said shaft is drivingly connected thereto, a plurality of propeller blades journaled by said hub on axes each in a plane radial to the hub to permit rotation of each blade to vary its pitch angle, and resilient means in said hub for applying biasing torque to said blades about the axes thereof in a direction to urge the same toward their greatest pitch angle, said means being responsive to rotative blade adjustment in the opposite direction under increasing fluid pressure load on the blades to increase the blade-biasing torque applied by said means, said resilient means including a bevel gear rotatable with each blade, a further bevel gear journaled in said hub on the axis of the latter and meshing in common with said blade gears, a first cam rotatable with said further gear, said further gear and first cam being rotatably journaled and axially fixed on said hub extension, a second cam mounted for axial sliding on said extension, said second cam coaxially engaging said first cam and being restrained in said hub against rotation relative to the latter, said second cam being axially movable in response to rotation of the first cam, and a spring unit urging said cams against one another, said spring unit being flexible from a position of minimum flexure corresponding to the greatest blade pitch angle to a position of maximum flexure corresponding to the least blade pitch angle, at which the spring unit is thereafter inflexible, and vice versa.

5. A propeller in accordance with claim 3, in which each cam has a series of circumferentially extending ramp surfaces in relatively slidable wedging engagement with those of the other, said spring unit urging said further bevel gear in mesh with the blade gears.

6. A propeller in accordance with claim 4, in which each cam has a series of circumferentially extending ramp surfaces in relatively slidable wedging engagement with those of the other, said spring unit urging said further bevel gear in mesh with the blade gears.

References Cited by the Examiner

UNITED STATES PATENTS

| 1,750,778 | 3/1930 | Kay. | |
|---|---|---|---|
| 1,851,874 | 3/1932 | Seppeler | 170—160.51 X |
| 1,931,710 | 10/1933 | Smith et al. | 170—160.51 |
| 2,097,643 | 11/1937 | Raggio | 170—160.51 |
| 2,440,046 | 4/1948 | Hautier | 170—160.45 X |
| 3,054,458 | 9/1962 | Marsico | 170—160.45 |
| 3,145,780 | 8/1964 | Kean | 170—160.13 |
| 3,204,702 | 9/1965 | Brown | 170—160.53 |

FOREIGN PATENTS

| 24,707 | 6/1922 | France. |
|---|---|---|
| 614,716 | 9/1926 | France. |
| 36,986 | 12/1935 | Netherlands. |

MARTIN P. SCHWADRON, *Primary Examiner.*

SAMUEL LEVINE, *Examiner.*

E. A. POWELL, JR., *Assistant Examiner.*